United States Patent
Bethke

(10) Patent No.: US 7,685,971 B1
(45) Date of Patent: Mar. 30, 2010

(54) COMFORT ADAPTER FOR ELECTRONIC COLLARS

(76) Inventor: Daniel Bethke, 619 Breezy Sage CT, Henderson, NV (US) 89015

(*) Notice: Subject to any disclaimer, the term of this patent is extended or adjusted under 35 U.S.C. 154(b) by 20 days.

(21) Appl. No.: 12/258,350

(22) Filed: Oct. 24, 2008

(51) Int. Cl.
*A01K 15/02* (2006.01)

(52) U.S. Cl. ..................... 119/719; 119/721

(58) Field of Classification Search .......... 199/719, 199/712, 718, 720, 721, 792, 856, 859, 858, 199/862, 863, 865, 905, 908; 340/573.1, 340/573.2, 573.3
See application file for complete search history.

(56) References Cited

U.S. PATENT DOCUMENTS

| | | | | |
|---|---|---|---|---|
| 4,802,482 A * | 2/1989 | Gonda et al. | ............... | 119/720 |
| 4,947,795 A * | 8/1990 | Farkas | ...................... | 119/718 |
| 5,666,908 A * | 9/1997 | So | ............................. | 119/720 |
| 6,459,378 B2 * | 10/2002 | Gerig | ..................... | 340/573.3 |
| 6,474,269 B2 * | 11/2002 | So | ............................. | 119/720 |
| 6,830,012 B1 * | 12/2004 | Swan | ....................... | 119/720 |
| 6,928,958 B2 * | 8/2005 | Crist et al. | .................. | 119/718 |
| 7,000,570 B2 * | 2/2006 | Napolez et al. | ............ | 119/718 |
| 7,243,617 B2 * | 7/2007 | Lalor | ......................... | 119/859 |
| 7,559,291 B2 * | 7/2009 | Reinhart | ..................... | 119/720 |
| 7,562,640 B2 * | 7/2009 | Lalor | ......................... | 119/719 |
| 2007/0221139 A1 * | 9/2007 | Reinhart | ..................... | 119/720 |
| 2009/0205583 A1 * | 8/2009 | So | ............................. | 119/719 |

\* cited by examiner

*Primary Examiner*—T. Nguyen
(74) *Attorney, Agent, or Firm*—James A. Italia; Italia IP

(57) ABSTRACT

A comfort adapter for electronic collars that replaces the standard post electrodes normally found on electronic training collars with a plurality of acorn nut electrodes. This design ensures proper electrical contact with the dog's skin while increasing the comfort of these collars on small dogs, which have smaller necks. The adapter can be utilized with different types of electronic training collars, such as those used to facilitate training, to curb aggressive behavior and barking, and to confine dogs by means of an invisible fence.

15 Claims, 3 Drawing Sheets

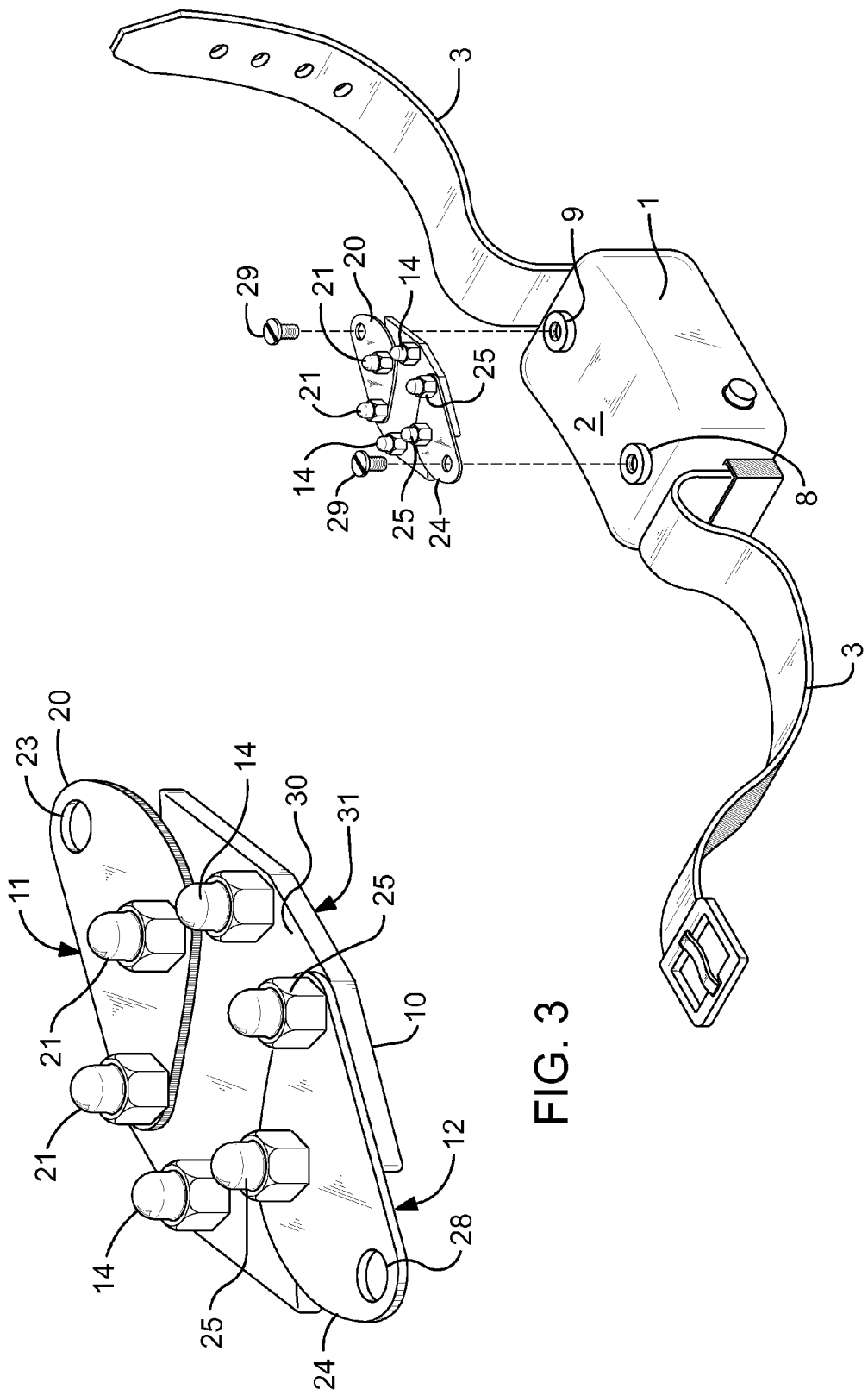

COMFORT ADAPTER FOR ELECTRONIC COLLARS

BACKGROUND OF THE INVENTION

It is well known to use electronic collars as aids for training for dogs. Such collars provide a mild electric shock to the animal as a correction technique to discourage actions such as aggressive behavior and barking, or to deter a dog from leaving a designated area bounded by what commonly is known as an invisible fence. While these are the most common uses for electronic collars, this invention also applies to electronic collars having other uses. The collars can be operated manually by means of a controller in the hands of an owner or a trainer, or automatically in response to the dog barking or moving within a specified distance of the invisible fence.

Electronic training collars comprise battery powered circuitry that can supply an electric charge across two electrode contact elements. Typically, the electrode contact elements comprise upstanding electrically conductive posts that are about one-half inch in length and terminate in a substantially pointed end, and are spaced about one and one-fourth inches apart. The posts must be pressed against the dog's skin to such an extent as to establish an area of contact that is of sufficient size to complete the circuit. This is accomplished by suitably tightening the collar about the dog's neck. Owing to the fact that this area of contact must be established with two relatively long and narrow posts, the tightening causes some discomfort to any dog upon which the collar is fitted. However, it can cause considerable discomfort to dogs with small necks, which can result in a reluctance of small dogs to submit to having the collar placed around their necks, as well as possible skin injury or irritation.

SUMMARY

The present invention provides a comfort adapter for use with electronic dog collars having a housing containing means for selectively generating an electrical charge and first and second external electrode connections on a housing inner face. Mounted on an electrically non-conductive base plate are first and second electrodes, Each electrode comprises an electrically conductive plate and a plurality of electrically conductive contact elements upstanding on the plate and in electrical communication with the plate. Means are provided for placing the first electrode in electrical communication with the first external electrode connection and for placing the second electrode in electrical communication with the second external electrode connection. Means also are provided for attaching the base plate, the first electrode and the second electrode to the housing inner face.

The present invention also provides a comfort adapter for use with electronic dog collars having a housing containing means for selectively generating an electrical charge and first and second external electrode connections on a housing inner face. Mounted on an electrically non-conductive base plate are first and second electrodes. Each electrode comprises an electrically conductive plate and a pair of electrically conductive acorn nuts upstanding on the plate and in electrical communication with the plate. A pair of electrically non-conductive upstanding acorn nuts mounted on the base plate interposed between the first and second electrodes. Means are provided for placing the first electrode in electrical communication with the first external electrode connection and for placing the second electrode in electrical communication with the second external electrode connection. Means also are provided for attaching the base plate, the first electrode, and the second electrode to the housing inner face.

BRIEF DESCRIPTION OF THE DRAWINGS

The drawings, when considered in conjunction with the following description, are presented for the purpose of facilitating an understanding of the invention sought to be protected.

FIG. 3 is a perspective view of the assembled small dog comfort adapter.

FIG. 4 is a perspective view of an electronic dog collar with the small dog comfort adapter in an exploded view.

While the present invention has been described in connection with what is considered the most practical and preferred embodiments, it is to be understood that it is not to be limited to the disclosed arrangements, but is intended to cover various arrangements which are included within the spirit and scope of the broadest possible interpretation of the appended claims so as to encompass all modifications and equivalent arrangements.

DESCRIPTION

Figure 1:
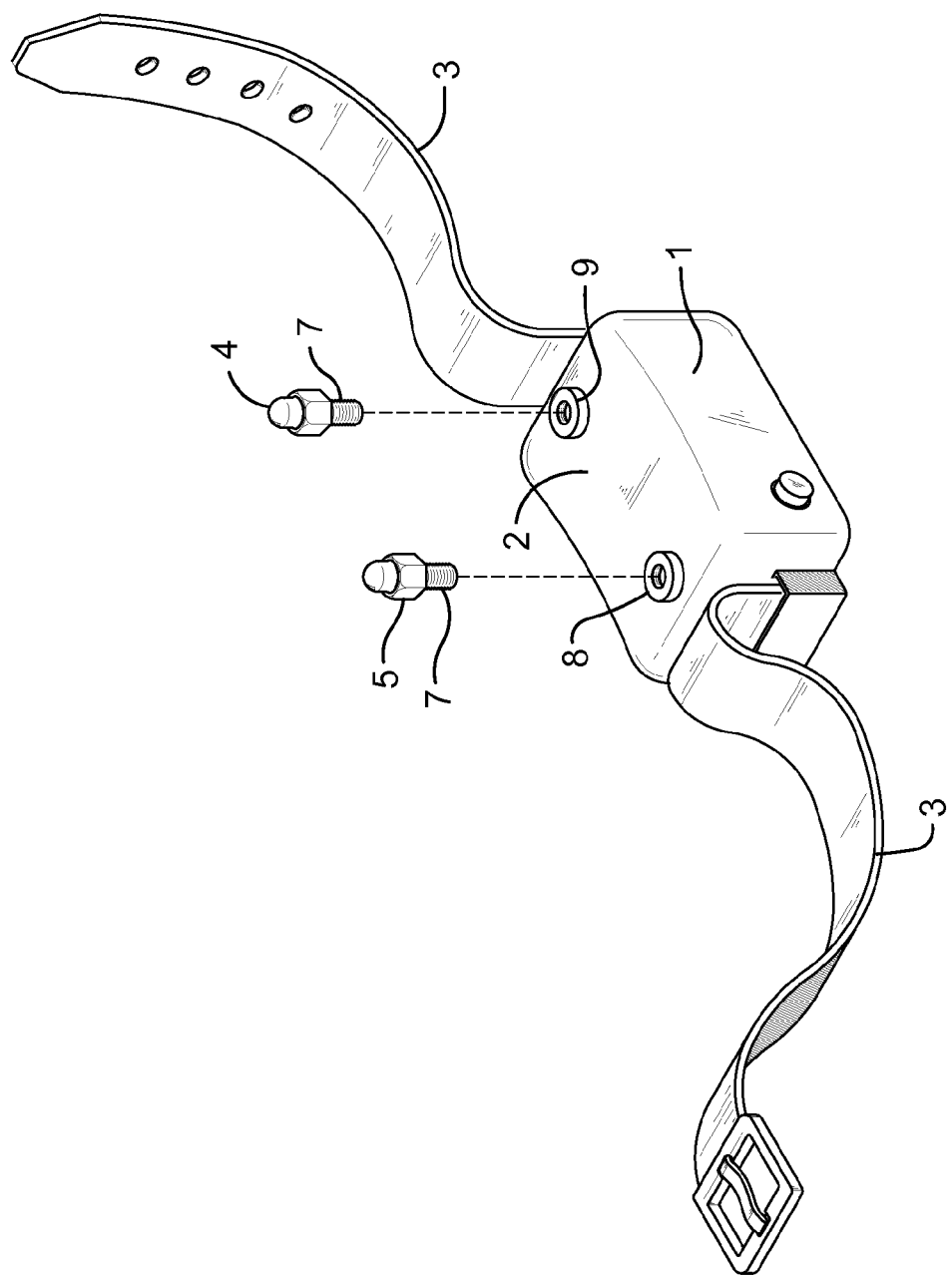
FIG. 1 is a perspective view of a prior art electronic collar showing the two electrode contact posts in an exploded view.

A typical prior art electronic dog training collar is shown in FIG. 1. It comprises a housing 1 having an inner face 2, adjustable collar straps 3, and a pair of spaced electrically conductive electrode contact elements in the form of elongated posts 4 and 5. Within housing 1 are an antenna, a battery, and the electronic circuitry that will generate an electrical charge. Posts 4 and 5 are provided with screw bases 7 which are received in threaded electrical connections 8 and 9 located on inner face 2. Threaded electrical connections 8 and 9 are of opposite electrical polarity as, it follows, are posts 4 and 5. The circuit is completed through the dog's skin, and therefore when the electronic circuitry is activated, a charge flows between posts 4 and 5 through the dog's skin, causing the dog to receive a mild electrical shock. Posts 4 and 5 typically are made of metal, are about one-half inch in length and terminate in a substantially pointed end, and are spaced apart by about one and one-fourth inches. Although posts 4 and 5 are shown in FIG. 1 as having threaded bases 7 which are received in threaded recesses 8 and 9, the opposite arrangement can be present, that is, threaded posts extending from inner surface 2 of housing 1 with threaded recesses being present at the base of each of posts 4 and 5.

Figure 2:
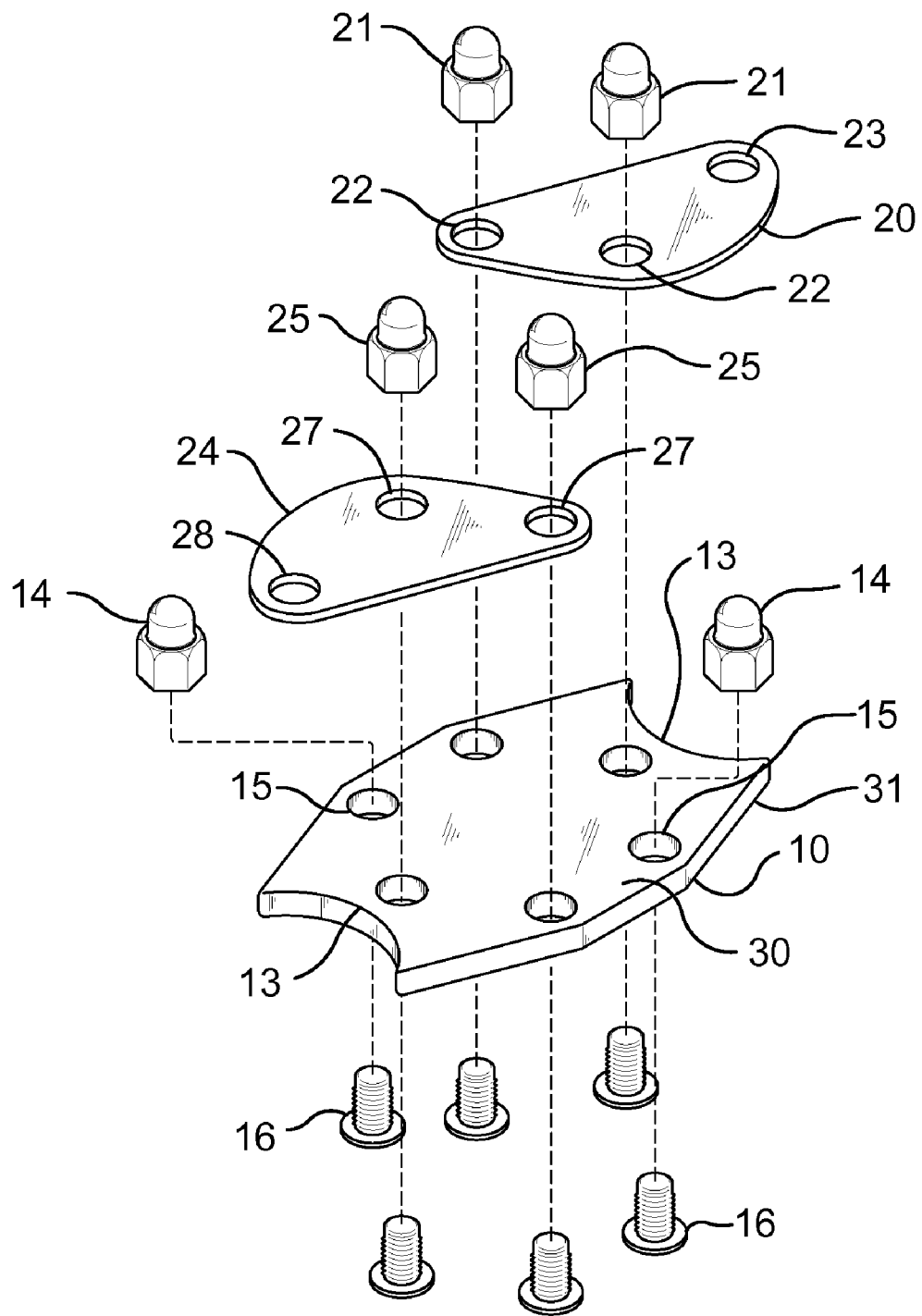
FIG. 2 is an exploded view of the components of an embodiment of the inventive small dog comfort adapter for electronic collars.

The inventive small dog comfort adapter replaces electrode posts 4 and 5 shown in FIG. 1 with an arrangement that is more comfortable for small dogs. FIG. 2 illustrates the components of the invention in an exploded view, and FIG. 3 after assembly. The adapter comprises a base plate 10 of electrically non-conductive material such as Lexan.™ Base plate 10 is shaped to fit on inner face 2 of housing 1, and includes cut-out portions 13 to accommodate threaded receptacles 8 and 9, as well as six holes 15. A pair of electrically non-conductive acorn nuts 14 of material such as nylon, are attached to the center portion of base plate 10 by means of six screws 16 extending through two of the holes 15.

A first electrode 11 (seen in FIG. 3) comprises an electrically conductive oblong-shaped plate 20 and two electrically conductive upstanding contact elements in the form of a pair of acorn nuts 21. Two more screws 16 attach together acorn nuts 21, plate 20, and base plate 10, passing through holes 22 in plate 20 and two of the holes 15 in base plate 10. This places plate 20 in electrical communication with acorn nuts 21. Plate 20 also has another hole 23, which will be used to attach electrode 11 to housing 1. A second electrode 12 (seen in FIG. 3) comprises an electrically conductive oblong-shaped plate 24 and two electrically conductive upstanding contact elements in the form of acorn nuts 25. As was the case with first electrode 11, acorn nuts 25 are held in electrical communication with plate 24 by means of two more screws 16, which also fasten plate 24 and acorn nuts 25 to base plate 10 via holes 27 in plate 24 and two of the holes 15 in base plate 10. Plate 24 also has another hole 28, which is to be used to attach electrode 12 to housing 1. Plates 20 and 24 are made of a conductive material such as aluminum, and acorn nuts 21 and 25 are of conductive material such as brass. Screws 16 also are advantageously made of conductive metal. Acorn nuts 21 and 25 are of conventional construction, having a dome-like shape, and can be expected to be about one-half of the length of prior art posts 4 and 5.

As is evident from FIG. 3, electrically conductive plates 20 and 24 are spaced from one another on electrically non-conductive base plate 10, with non-conductive acorn nuts 14 being interposed therebetween. As shown in FIG. 4, the inventive adapter is attached to housing 1 by a pair of electrically conductive screws 29 which pass through holes 23 and 28, respectively, in plates 20 and 24, and are screwed into threaded connections 8 and 9. This also electrically connects electrodes 11 and 12 to the electrical circuit within housing 1. While FIG. 4 illustrates a housing where electrical connections 8 and 9 constitute threaded recesses, threaded posts also could be used, in which case plates 20 and 24 would be attached by nuts screwed onto the threaded posts. Furthermore, while the drawings show the plates 20 and 24 being mounted on inner surface 30 of base plate 10, they also can be mounted on the outer surface 31 of base plate 10, in which case electrically conductive metal screws 16 must be used to place acorn nuts 21 and 25 in electrical communication with plates 20 and 24.

Among the reasons why the inventive adapter is more comfortable for the dog to wear than the prior art two post system are the following: The lesser height of the acorn nuts results in less intrusion into the skin on the dog's neck when the collar is tightened to the extent necessary to complete the electrical circuit when the collar is activated. The rounded ends of acorn nuts also contribute to less intrusion and provide more comfort than the upstanding posts used on the prior art devices. The presence of two electrically conductive acorn nuts rather than a single post for each electrode provides a greater area of electrical contact with the dog's skin, thus facilitating the flow of the electrical charge though the dog's skin and smoothing out the application stimulation provided by the electrical charge. The electrically non-conductive acorn nuts eliminate the large gap that would otherwise be present between the upstanding acorn nuts of the two electrodes, and the symmetrical arrangement of the six acorn nuts spreads the force applied to the dog's neck by the collar over a much larger area than the prior art system, thus increasing comfort and reducing skin irritation.

While the present disclosure has been described in connection with what is considered the most practical and preferred embodiments, it is understood that this disclosure is not limited to the disclosed embodiments, but is intended to cover various modifications and arrangements included within the spirit and scope of the broadest interpretation so as to encompass all such modifications and equivalent arrangements.

I claim:

1. A comfort adapter for use with electronic dog collars having a housing containing means for selectively generating an electrical charge and first and second external electrode connections on a housing inner face, comprising
    an electrically non-conductive base plate;
    a first electrode mounted on said base plate, said first electrode comprising an electrically conductive first plate and a plurality of electrically conductive first contact elements upstanding on said first plate and in electrical communication with said first plate;
    a second electrode mounted on said base plate, said second electrode comprising an electrically conductive second plate spaced from said first plate and a plurality of electrically conductive second contact elements upstanding on said second plate and in electrical communication with said second plate;
    means for placing said first electrode in electrical communication with said first external electrode connection and means for placing said second electrode in electrical communication with said second external electrode connection; and
    means for attaching said base plate, said first electrode and said second electrode to said housing inner face.

2. The comfort adapter of claim 1 further comprising a plurality of electrically non-conductive upstanding third contact elements on said base plate interposed between said first electrode and said second electrode.

3. The comfort adapter of claim 1 wherein said plurality of first contact elements and said plurality of second contact elements each comprise electrically conductive acorn nuts.

4. The comfort adapter of claim 1 wherein said first and second external electrode connections on said housing inner face comprise first and second threaded recesses, and wherein said means for placing said first electrode and said second electrode in electrical communication with said first and second external electrode connections comprise electrically conductive screws in contact respectively with said first electrode and said second electrode and receivable in said first and second threaded recesses.

5. The comfort adapter of claim 1 wherein said first external electrode connection and second external electrode connection on said housing inner face comprise upstanding first and second threaded posts, and wherein said means for placing said first electrode and said second electrode in electrical communication with said first and second external electrode connections comprise electrically conductive nuts in contact respectively with said first electrode and said second electrode and receivable by said first and second threaded posts.

6. The comfort adapter of claim 1 further comprising a plurality of electrically non-conductive upstanding third contact elements on said base plate interposed between said first electrode and said second electrode, and wherein said first contact elements, said second contact elements and said third contact elements are arranged in a substantially circular array.

7. The comfort adapter of claim 1 wherein said base plate further comprises a base plate inner face, and said first electrode and said second electrode are mounted on said base plate inner face.

8. The comfort adapter of claim 1 wherein said base plate further comprises a base plate outer face, and said first electrode and said second electrode are mounted on said base plate outer face.

9. A comfort adapter for use with electronic dog collars having a housing containing means for selectively generating an electrical charge and first and second external electrode connections on a housing inner face, comprising an electrically non-conductive base plate;

a first electrode mounted on said base plate, said first electrode comprising an electrically conductive first plate and a first pair of electrically conductive acorn nuts upstanding on said first plate and in electrical communication with said first plate;

a second electrode mounted on said base plate, said second electrode comprising an electrically conductive second plate spaced from said first plate and a second pair of electrically conductive acorn nuts upstanding on said second plate and in electrical communication with said second plate;

a pair of electrically non-conductive upstanding acorn nuts mounted on said base plate interposed between said first electrode and said second electrode;

means for placing said first electrode in electrical communication with said first external electrode connection and means for placing said second electrode in electrical communication with said second external electrode connection; and means for attaching said base plate, said first electrode and said second electrode to said housing inner face.

10. The comfort adapter of claim 9 wherein said first and second external electrode connections on said housing inner face comprise first and second threaded recesses, and wherein said means for placing said first electrode and said second electrode in electrical communication with said first and second external electrode connections comprise electrically conductive screws in contact respectively with said first electrode and said second electrode and receivable in said first and second threaded recesses.

11. The comfort adapter of claim 9 wherein said first and second external electrode connections on said housing inner face comprise upstanding first and second threaded posts, and wherein said means for placing said first electrode and said second electrode in electrical communication with said first and second external electrode connections comprise electrically conductive nuts in contact respectively with said first electrode and said second electrode and receivable by said first and second threaded posts.

12. The comfort adapter of claim 9 wherein said pair of electrically non-conductive upstanding acorn nuts and said first and second pairs of electrically conductive acorn nuts are arranged in a substantially circular array.

13. The comfort adapter of claim 9 wherein said base plate is made of Lexan™, said first and second electrically conductive plates are made of aluminum, said first and second pairs of electrically conductive acorn nuts are made of brass, and said pair of non-conductive acorn nuts are made of nylon.

14. The comfort adapter of claim 9 wherein said base plate has a base plate inner face and said first electrode and said second electrode are mounted on said base plate inner face.

15. The comfort adapter of claim 9 wherein said base plate has a base plate outer face and said first electrode and said second electrode are mounted on said base plate outer face.

\* \* \* \* \*